US011563782B2

(12) United States Patent
Synal

(10) Patent No.: US 11,563,782 B2
(45) Date of Patent: Jan. 24, 2023

(54) ENRICHED CALLING BASED CALL ROUTING

(71) Applicant: T-Mobile USA, Inc., Bellevue, WA (US)

(72) Inventor: Adrian T. Synal, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/897,155

(22) Filed: Jun. 9, 2020

(65) Prior Publication Data

US 2021/0385257 A1    Dec. 9, 2021

(51) Int. Cl.
| | | |
|---|---|---|
| *H04M 3/00* | (2006.01) | |
| *H04M 5/00* | (2006.01) | |
| *H04L 12/66* | (2006.01) | |
| *H04L 65/1104* | (2022.01) | |
| *H04M 7/00* | (2006.01) | |
| *H04L 65/1069* | (2022.01) | |
| *H04L 65/1016* | (2022.01) | |

(52) U.S. Cl.
CPC ...... *H04L 65/1104* (2022.05); *H04L 65/1016* (2013.01); *H04L 65/1069* (2013.01); *H04M 7/006* (2013.01)

(58) Field of Classification Search
CPC ............ H04L 65/1016; H04L 65/1069; H04L 65/1006; H04L 65/1073; H04L 29/06027; H04L 51/24; H04L 67/16; H04L 65/1083; H04L 65/105; H04L 67/303; H04L 12/189; H04L 51/38; H04L 63/102; H04L 67/306; H04L 29/06; H04L 51/10; H04L 67/24; H04L 29/06197; H04M 7/006; H04M 3/42059; H04M 2201/50; H04M 3/42365; H04M 3/42374; H04M 7/123; H04M 3/436; H04M 7/1235; H04M 1/2535; H04M 3/42042; H04M 3/42068
USPC .............. 709/227, 206, 228, 203; 379/88.12, 379/88.13; 370/352, 252, 353
See application file for complete search history.

(56) References Cited

U.S. PATENT DOCUMENTS

| | | | | |
|---|---|---|---|---|
| 6,310,944 B1 * | 10/2001 | Brisebois | .......... | H04M 3/42042 |
| | | | | 379/142.01 |
| 6,771,755 B1 * | 8/2004 | Simpson | .................. | H04M 3/02 |
| | | | | 379/142.01 |
| 7,443,964 B2 * | 10/2008 | Urban | ..................... | H04W 4/14 |
| | | | | 379/88.23 |
| 9,420,103 B1 * | 8/2016 | Varman | ................. | H04L 67/146 |
| 10,079,939 B1 * | 9/2018 | Bostick | ............ | H04M 3/42068 |
| 11,019,211 B1 * | 5/2021 | Kwak | ................. | H04M 3/5237 |

(Continued)

OTHER PUBLICATIONS

Office Action for U.S. Appl. No. 16/897,115, dated Jun. 9, 2021, Synal, "Enriched Calling Based Call Type Notification" 12 pages.

*Primary Examiner* — Kharye Pope
(74) *Attorney, Agent, or Firm* — Lee & Hayes, P.C.

(57) ABSTRACT

Systems, methods and apparatuses for implementing enriched calling services for devices may include a first User Equipment (UE) that sends a call request to an IP Multimedia Subsystem (IMS) Core network and a presence server. The IMS core network may determine that the first UE supports enriched calling services and may enable the first UE to perform an enriched calling operation. The IMS core network may forward the call request to a terminating device, such as a second UE and/or a computing device, with the enriched calling operation.

20 Claims, 11 Drawing Sheets

(56) References Cited

U.S. PATENT DOCUMENTS

| | | | | |
|---|---|---|---|---|
| 2007/0047726 A1* | 3/2007 | Jabbour | ................ | H04M 1/575 |
| | | | | 379/373.02 |
| 2008/0123603 A1* | 5/2008 | Cai | .................... | H04L 65/1016 |
| | | | | 370/338 |
| 2009/0164519 A1* | 6/2009 | Vainio | .................... | G06F 16/285 |
| 2010/0124318 A1* | 5/2010 | Cai | .................... | H04L 65/1006 |
| | | | | 379/93.24 |
| 2011/0026692 A1* | 2/2011 | Sharp | .................... | H04W 68/08 |
| | | | | 379/88.23 |
| 2012/0322469 A1* | 12/2012 | Cai | ........................ | H04L 51/00 |
| | | | | 455/466 |
| 2018/0295234 A1* | 10/2018 | Kumar Selvaraj | ......................... | |
| | | | | H04L 65/1006 |
| 2019/0312966 A1* | 10/2019 | Shin | ...................... | H04W 76/50 |
| 2019/0387030 A1 | 12/2019 | Sridhar et al. | | |
| 2019/0394328 A1 | 12/2019 | Agarwal | | |
| 2021/0385258 A1 | 12/2021 | Synal | | |

* cited by examiner

1100 ⤵

RECEIVE A CALL REQUEST FROM A TELEPHONY APPLICATION SERVER (TAS) ASSOCIATED WITH A USER EQUIPMENT (UE), THE CALL REQUEST INCLUDING MULTIPLE PARSED WORDS OF A SUBJECT LINE ASSOCIATED WITH THE CALL REQUEST
1102

↓

IDENTIFY A WORD FROM THE MULTIPLE PARSED WORDS
1104

↓

DETERMINE THAT THE WORD IS ASSOCIATED WITH AT LEAST ONE SUB-ENTITY OF AN ENTITY
1106

↓

ROUTE THE CALL REQUEST TO THE AT LEAST ONE SUB-ENTITY IN RESPONSE TO THE AT LEAST ONE SUB-ENTITY BEING ASSOCIATED WITH THE WORD
1108

FIG. 11

ENRICHED CALLING BASED CALL ROUTING

BACKGROUND

In IP Multimedia Subsystems (IMS), a device (e.g., user equipment, herein referred to as a UE) may be capable of enriched calling that allows the IMS to determine additional information associated with the UE, and/or with a call session being attempted by the UE. With the proliferation of UEs and their enriched calling capabilities, it becomes increasingly important to efficiently determine which UEs and systems are enriched calling compatible, what additional information is included in a request to make an enriched call, and what action to take based on the additional information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 11 depicts another example process for enabling enriched calling services on a UE.

DETAILED DESCRIPTION

Overview

Figure 1:
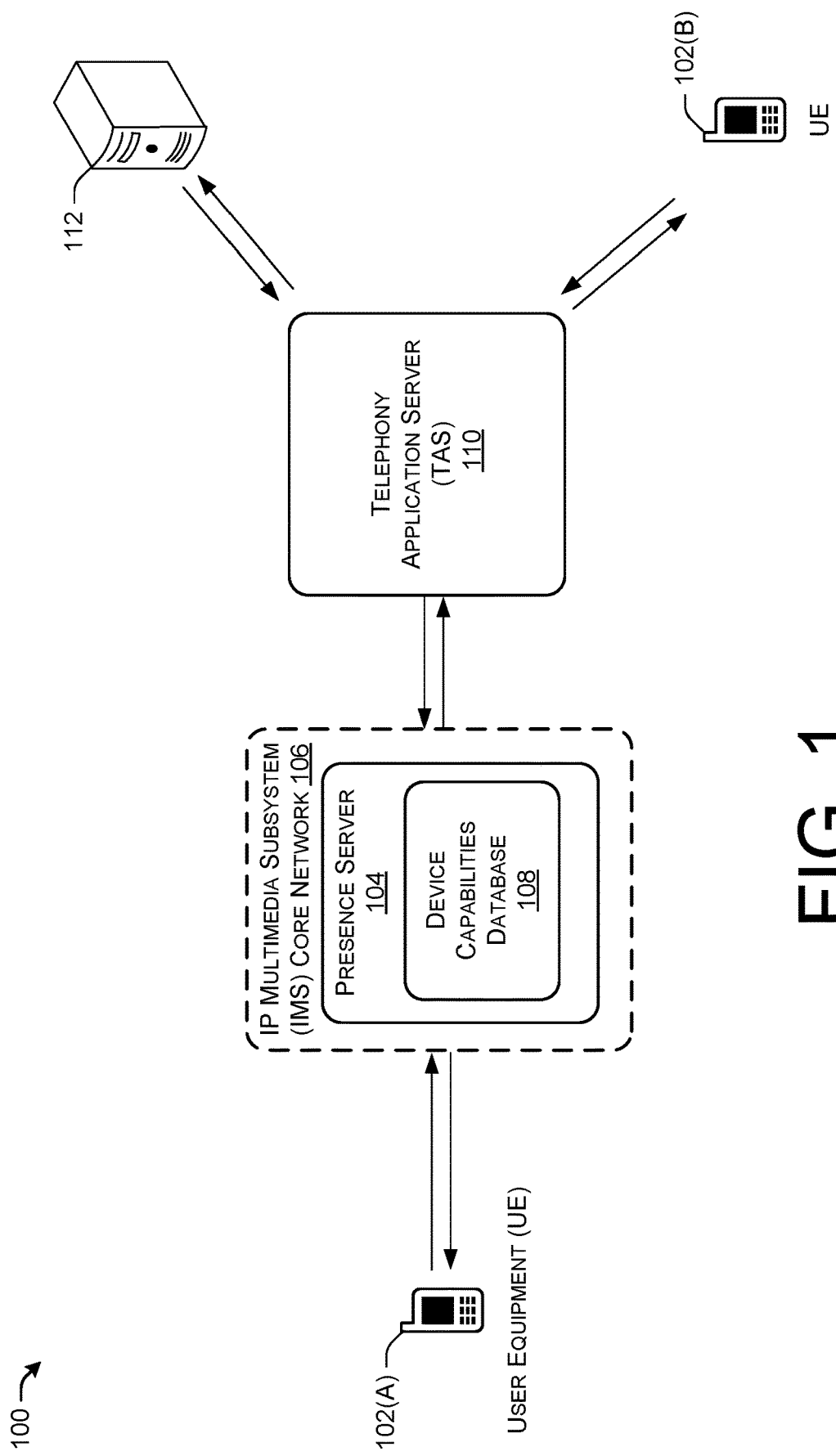
FIG. 1 depicts an example environment in which systems, methods, and apparatuses may implement enriched calling determination for devices.

This disclosure is directed to systems, methods and apparatuses for implementing enriched calling services for devices (hereinafter referred to as "the system"). The system may include an IP Media Subsystem (IMS) core network environment with multiple User Equipments (UE) communicating via device and application communication features. The multiple UEs may comprise a mix of various hardware manufacturers and models, various operating systems of different versions, and various applications of different versions operating on the devices. Accordingly, the IMS core network may determine additional information associated with a UE or a UE attempting to make a call and use the additional information to take an action.

In some examples, the system may comprise a UE that is attempting to place a call to an entity that utilizes Speech Interactive Voice Response (SIVR) and/or an Automated Attendant (AA). Historically, SIVR and/or an AA requires voice input from the user making the call or require that the user press keys to navigate a call tree. Such methods may provide the user with a poor quality-of-experience and/or cause the user to be on the call for longer than necessary, resulting in additional resources being used in the system. For an entity that may receive thousands of calls a day, it is of the up most importance to have the user quickly connected with the sub-entity (e.g., billing department, service plan department, account information department, etc.) that the user is attempting to communicate with.

In some examples, the system may receive a call request from the UE. The call request may include a telephone number that is associated with an entity that operates a SIVR, an AA, a call tree, or the like. In some cases, the system may determine that the telephone number is a publicly facing phone number for an entity (e.g., business) that includes multiple sub-entities (e.g., departments of the business) and that each sub-entity is associated with a sub-entity telephone number that is different than the telephone number received from the call request.

In some examples, the system may determine that the UE has enriched calling capabilities. For example, call request may include identifying information associated with the UE (e.g., Mobile Station International Subscriber Directory Number (MSISDN) values, etc.) and the system may store information associated with the UE, such as whether or not the UE has enriched calling capabilities. In some examples, the call request may include an indication that the UE has enriched calling capabilities and the system may determine that the UE has enriched calling capabilities based on the call request.

In some examples, the system may determine that the call request includes a subject line in response to determining that the UE has enriched call capabilities. For example, once the system determines that the UE has enriched call capabilities, the system may cause the UE to present a subject line field that allows the user to enter a subject associated with the call. In some cases, the UE may present the subject line field automatically when the user is making a call.

In some examples, the system may parse words from the subject line and determine each word in the subject line. For example, the system may store a list of words and a list of sub-entities that each correspond to a respective word. For instance, the system may receive a subject line reading "why is my bill so high?" and parse out the individual words from the subject line. The system may determine a sub-entity associated with one of the parsed-out words, such as a billing department being associated with the word "bill."

In some examples, once the system determines that the UE has enriched calling capabilities, the system may determine a call type associated with the call request. For example, historically, when a terminating device is receiving an incoming call, the terminating device does not inform the user whether the incoming call is a conference call involving multiple individuals or is a singular call involving only the user associated with the incoming call telephone number.

This may result in an unpleasant surprise for a user answering an incoming call who does not wish to be included in the conference call.

In some examples, the system may determine a call type (e.g., conference call, group call, AdHoc conference call, singular call) associated with the call request and provide an indicator to the terminating device along with the call that indicates the call type, thereby allowing the user of the terminating device to decline a call if the call type indicates a situation that they do not wish to be involved in.

Multiple and varied example implementations and embodiments are described throughout this disclosure. Examples and portions of the systems, methods, and apparatuses discussed herein may be rearranged, combined, used together, duplicated, partially omitted, omitted entirely, and/or may be otherwise modified to arrive at variations on the disclosed implementations that combine one or more aspects of the systems, methods, and apparatuses.

Illustrative Systems, Methods, and Apparatuses for Implementing Enriched Calling Capability Determination FIG. 1 depicts an example system 100 for enriched calling capability determination with devices. The system 100 may include a first UE 102(A) that communicates with a presence server 104 and is in communication with an IMS core network 106. The first UE 102(A) may communicate with the presence server 104 via the IMS core 106. The first UE 102(A) may send a subscribe message including information about the first UE 102(A), which the presence server 104 may store in a device capabilities database 108 upon receiving the subscribe message. In some cases, the presence server 104 may send an acknowledgement to the first UE 102(A) to confirm that the subscribe message was received, and/or that information from the subscribe message has been extracted and stored in the device capabilities database 108.

In some examples, the presence server 104 may comprise a server device that receives, stores, and sends presence information associated with one or more UEs. For instance, the presence information may comprise one or more status indicators that convey capabilities and/or availability of the one or more UEs for communicating with other one or more UEs. The presence server 104 may communicate with a telephony application server (TAS) 110 and/or other nodes of the IMS core network 106 in order to facilitate receiving and sending the presence information. In some cases, the UE 102(B) may communicate with the presence server 104 and may inform the presence server 104 of the capabilities associated with the UE 102(B). For example, the UE 102(B) may send a SIP PUBLISH message and/or a SIP OPTIONS message to the presence server 104, the IMS core network 106, and/or the TAS 110.

In some embodiments, the first UE 102(A) may comprise a cell phone, a smartphone, a smart watch, a laptop computer, a desktop computer, a smart home device, a tablet device, an Internet-of-Things device, or other types of devices or mobile devices that communicate via the IMS core network 106. In some instances, the first UE 102(A) may comprise a device identifier that is unique to the particular first UE 102(A). The device identifier may comprise a universally unique identifier (UUID), an International Mobile Equipment Identity (IMEI), or even an absence of an identifier value which, in some examples, may be associated with a particular type of device (e.g., iPhone®) and may, therefore, function as a device identifier by default. In some examples, the first UE 102(A) may be associated with a subscriber number, such as an MSISDN value. The first UE 102(A) may be associated with a single MSISDN value or with multiple MSISDN values. The MSISDN value associated with the first UE 102(A) may change over time and/or may be associated with other UEs. In some instances, the device identifier and/or the MSISDN value may comprise information stored at and/or extracted from a subscriber identity module (SIM) card of the first UE 102(A). In some cases, the first UE 102(A) may utilize Voice over (Vo) LTE and/or Video over (Vi) LTE to communicate with any one of the presence server 104, the IMS core network 106, the TAS 110, and/or any other device within the system 100. In some cases, a VoLTE communication may be sent to the TAS 110 and the TAS 110 may interrogate the presence server 104 to establish a communication session.

In some embodiments, the TAS 110, the presence server 104, the first UE 102(A), and/or other elements of the IMS core network 106 may comprise one or more memory device(s) and/or one or more processor(s). The one or more memory device(s) may comprise non-transitory computer-readable media including, but not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, a quantum-state storage device, genetic encoding storage device, or any other medium that can be used to store information for access by an electronic device.

The one or more processor(s) may comprise a microprocessor, a microcomputer, a microcontroller, a digital signal processor, a central processing unit (CPU), a graphics processing unit (GPU), a quantum processor, etc. Among other capabilities, the one or more processor(s) may operate to fetch and execute computer-readable instructions stored in the one or more memory device(s) to perform the operations disclosed herein.

In some examples, the UE 102(A) may attempt to place a call to an entity (e.g., business) that operates a SIVR, an AA, a call tree, or the like. In some examples, the IMS core network 106 may receive a call request from the UE 102(A). In some cases, the IMS core network 106 may determine that the call is directed towards an entity that operates a SIVR, an AA, a call tree, or the like prior to the user placing the call request (e.g., before a call button is pressed) or during the call request (e.g., after the call button is pressed). The call request may be a session initiation protocol (SIP) subscribe message and include a telephone number that is associated with an entity that operates a SIVR, an AA, a call tree, or the like, and is associated with the computing device 112. In some cases, the IMS core network 106 may determine that the telephone number is a publicly facing phone number for an entity that includes multiple sub-entities and that each sub-entity is associated with a sub-entity (e.g., department of a business) telephone number that is different than the telephone number received from the call request.

In some examples, the IMS core network 106 may determine that the UE 102(A) has enriched calling capabilities. For example, the IMS core network 106 may interrogate the presence server 104 to determine capabilities associated with the UE 102(B) and to determine if the UE 102(B) supports enriched calling capabilities. In some cases, the IMS core network 106 may send the call request to the presence server 104 and the presence server 104 may determine whether or not the UE 102(A) has enriched calling capabilities. In some examples, the presence server 104 may access the device capabilities database 108 to determine if the UE 102(A) has enriched calling capabilities. In some examples, the call request may include an indication that the UE 102(A) has enriched calling capabilities and the IMS core network 106 may determine that the UE 102(A) has enriched calling capabilities based on the call request.

In some examples, the IMS core network 106 may determine that the call request includes a subject line in response to determining that the UE 102(A) has enriched call capabilities. For example, once the presence server 104 determines that the UE 102(A) has enriched calling capabilities, the IMS core network 106 may cause the UE 102(A) to present a subject line field that allows a user associated with the UE 102(A) to enter a subject associated with the call request. In some cases, the UE 102(A) may present the subject line field automatically when the user is making a call. In some cases, the user may enter text into the subject line via touch input on a text entry system of the UE 102(A) or the user may enter text into the subject line via a speech to text system of the UE 102(A).

In some examples, the IMS core network 106 may provide the call request and the subject line to the TAS 110. The TAS 110 may parse words from the subject line and determine each word in the subject line. In some cases, the TAS 110 may send the call request, the subject line, and the individually parsed words to a computing device 112. The computing device 112 may comprise an artificial intelligence component, a media resource function (MRF) component, or the like. For example, the computing device 112 may store a list of words and a list of sub-entities that each correspond to a respective word. For instance, the IMS core network 106 may receive a subject line reading "why is my bill so high?" The TAS 110 may parse out the individual words (e.g., "why," "is," "my," "bill," "so," and "high") from the subject line and send the parsed words with the call request to the computing device 112. The computing device 112 may determine a sub-entity associated with one of the parsed-out words, such as a billing department being associated with the word "bill." In some cases, the computing device 112 may assign a weight to each individual word based on a relevancy of the word. For example, the word "bill" may be assigned a greater weight than the words "is" and "so." The weights may be based on a user history (e.g., previous calls and/or searches associated with a user), word type of words in the subject line (e.g., noun, pro-noun, adjective, verb, etc.), or other criteria.

In some examples, once the computing device 112 determines a sub-entity in which the user associated with the UE 102(A) wishes to communicate with, the computing device 112 may forward the call request to the sub-entity directly. In some cases, the sub-entity may be associated with a telephone number that is different than the telephone number initially entered into the UE 102(A) and is associated with the call request. Thereby preventing the user associated with the UE 102(A) from having to navigate a call tree and/or interact with an SIVR or AA.

In some examples, once the presence server 104 determines that the UE 102(A) has enriched calling capabilities, the IMS core network 106 may determine a call type associated with the call request. For example, the call request (e.g., SIP invite) may include a telephone number associated with a terminating device, such as UE 102(B). The call request may indicate whether the call is a singular call (e.g., a one-on-one call between the UE 102(A) and UE 102(B)) or a group call. In some cases, a group call may include a number of other UEs and the call request may indicate that a call session has already been initiated between the UE 102(A) and the other UEs. In some cases, the group call may include an AdHoc conference call.

In some examples, the IMS core network 106 may determine if the terminating device, in this case, UE 102(B) supports enriched calling capabilities. For example, the IMS core network 106 may send the call request to the presence server 104 and the presence server 104 may determine whether or not the UE 102(B) has enriched calling capabilities. In some cases, the IMS core network 106 may interrogate the presence server 104 to determine capabilities associated with the UE 102(B) and to determine if the UE 102(B) supports enriched calling capabilities. In some examples, the presence server 104 may access the device capabilities database 108 to determine if the UE 102(B) has enriched calling capabilities.

In some examples, the IMS core network 106 may determine a call type (e.g., conference call, group call, singular call) associated with the call request and provide the call request as well as an indicator of the call type to the UE 102(B), thereby allowing the user of the UE 102(B) to decline a call if the call type indicates a situation that they do not wish to be involved in. In some cases, the TAS 110 may determine a call type (e.g., conference call, group call, singular call) associated with the call request and provide the call request as well as an indicator of the call type to the UE 102(B). For example, the IMS core network 106 and/or the TAS 110 may prepend into a subject field associated with the call request a call identifier string (e.g., "conference," "individual," etc.) such that when the UE 102(B) receives the call request, the UE 102(B) can identify the call type based on the call identifier string in the subject field.

Multiple and varied example implementations and embodiments are described throughout this disclosure. Examples and portions of the systems, methods, and apparatuses discussed herein may be rearranged, combined, used together, duplicated, partially omitted, omitted entirely, and/or may be otherwise modified to arrive at variations on the disclosed implementations that combine one or more aspects of the systems, methods, and apparatuses.

Figure 2:
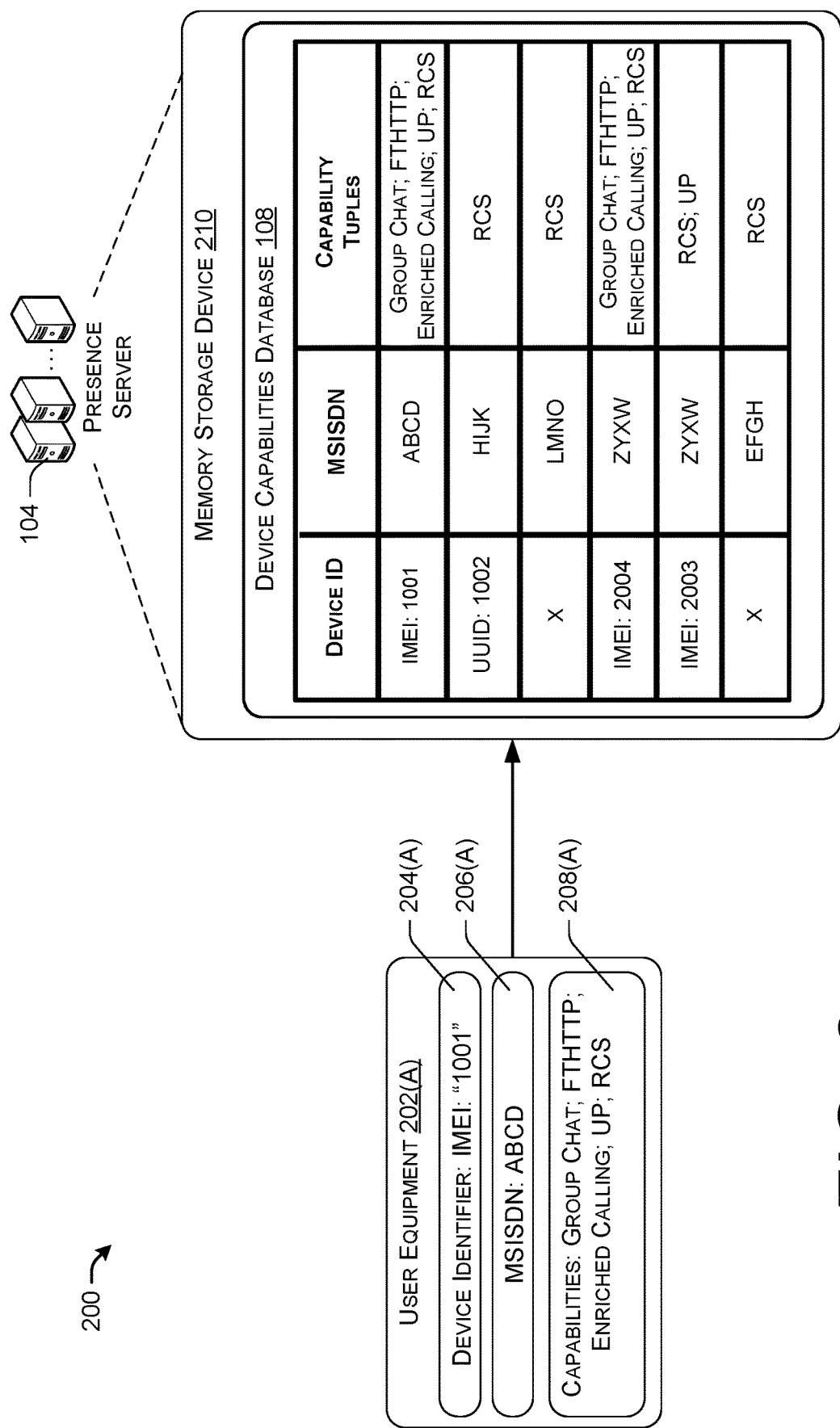
FIG. 2 depicts a schematic diagram of a device capabilities database stored in a presence server, which may form a portion of the systems, methods, and apparatuses of FIG. 1.

FIG. 2 depicts a schematic diagram of UE devices communicating with the presence server 104. For instance, a system 200 (which may be similar or identical to the system 100) may include a first UE 202(A). UE 202(A) may communicate with the presence server 104, as discussed in greater detail below regarding FIGS. 3 and 5.

In some examples, UE 202(A) may comprise a first device identifier 204(A) comprising a first device identifier type (e.g., IMEI) and a first device identifier value (e.g., "1001") which is particular to the UE 202(A) device, and in some instances may indicate a model and/or manufacturer of UE 202(A). UE 202(A) may include a first MSISDN value 206(A) (e.g., "ABCD") stored in a memory of UE 202(A) that indicates a subscriber of UE 202(A). UE 202(A) may store a first set of one or more device capability indicators 208(A) in memory. For instance, UE 202(A) may comprise a rich communication services (RCS)-enabled device via hardware and software embedded in the device by the manufacturer to execute RCS applications. As an RCS-enabled device, UE 202(A) may store various RCS-based messaging enhancement features, including capability indicators to share with other RCS-enabled devices communicating via the RCS applications. For example, UE 202(A) may store the first set of one or more device capability indicators 208(A) such as a group chat indicator, a File Transfer over Hypertext Transfer Protocol (FTHTTP) capability (e.g., file transfer of 100 MB) indicator, and/or an enriched calling capability indicator. UE 202(A) may store a Universal Profile (UP) capability indicator, an RCS capability indicator, and/or UP and RCS capabilities may be derived from other capability indicators representing capabilities that are included in the RCS or UP suites of services (e.g., group chat and FTHTTP).

In some embodiments, the presence server 104 may store the device capabilities database 108 in a memory storage device 210, which may comprise any of the memory devices discussed above. The memory storage device 210 may be located at a same physical node as other components of the presence server 104, at a different physical node, or combinations thereof.

The device capabilities database 108 may comprise one or more of a comma delimited list, a spreadsheet, an array, a NoSQL data structure, a hash-based data structure, an object-based data structure, or any other data type, data structure, and/or data system for storing retrievable data in memory. In some examples, the device capabilities database 108 may comprise a spreadsheet with at least a first column for storing one or more device identifier values, a second column for storing one or more MSISND values, and a third column for storing one or more sets of one or more device capability indicators or tuples. A row of the spreadsheet may correspond to a particular device, as represented by the device identifier value of the first column in the row, and the other values of the row may be associated with the device identifier value and/or with each other.

For instance, the first example row illustrated in FIG. 2 includes one or more values that may be associated with the first UE 202(A), such as a device identifier of "IMEI: 1001" indicating the device identifier type of IMEI and the device identifier value of "1001." The second column of the first row includes the MSISDN value "ABCD," and the third column of the first row may include a set of one or more device capability indicator values including "group chat;" "FTHTTP;" "enriched calling;" "UP;" and/or "RCS." Accordingly, the presence server 104 may determine, based on the values stored in the first row, that the device (e.g., UE 202(A)) associated with the device identifier "IMEI: 1001" is associated with the MSISDN value "ABCD" and the device capability indicators of "group chat;" "FTHTTP;" "enriched calling;" "UP;" and "RCS."

Figure 3:
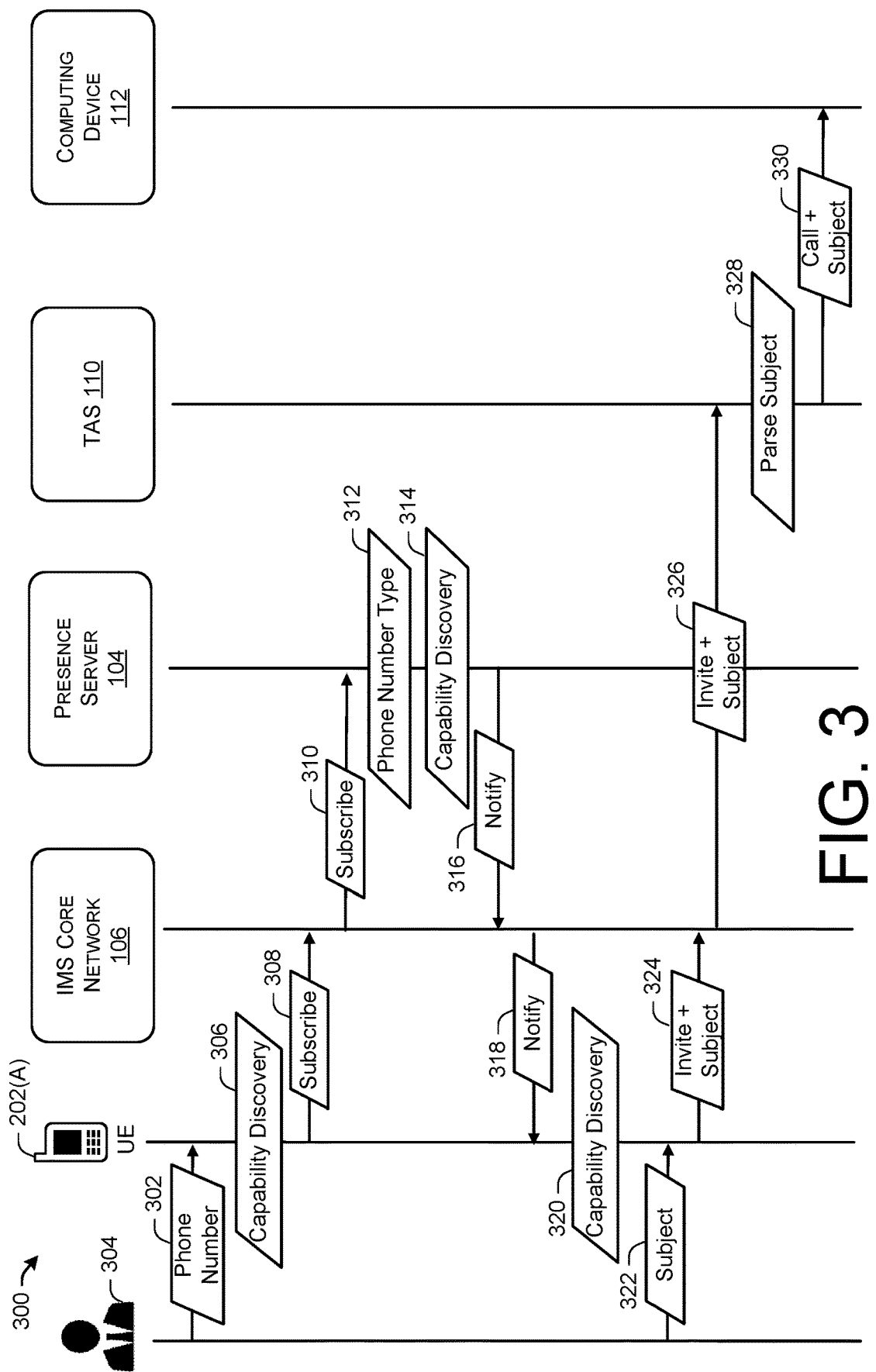
FIG. 3 depicts a call flow diagram illustrating example interactions of the systems, methods, and apparatuses of FIG. 1 during one or more enriched calling processes.

FIG. 3 depicts a call flow diagram illustrating example interactions of the systems disclosed herein during an enriched calling determination process. For instance, a system 300 (which may be similar or identical to the system(s) 100 and/or 200) may include first UE 202(A) in communication with the presence server 104 via the IMS core network 106, the TAS server 110, and the computing device 112.

In some examples, the interactions of system 300 may include a phone number 302 entered into the UE 202(A) by a user 304. The phone number 302 may be a publicly facing phone number associated with an entity that utilizes SIVR, an AA, a call tree, or the like. In some cases, the UE 202(A) may perform a capability discovery 306 to determine if the UE 202(A) supports enriched calling. In some cases, if the UE 202(A) does support enriched calling, the UE 202(A) may provide an option to the user 304 via an interface of UE 202(A) to enter a subject line to be associated with the phone number 302.

In some embodiments, in response to receiving the phone number 302, the UE 202(A) may generate and/or send a subscribe message 308 to the presence server 104 via the IMS core network 106. In some cases, the IMS core network 106 may forward the subscribe message 308 to the presence server 104 as subscribe message 310.

In some embodiments, the subscribe message 308 and/or the subscribe message 310 may comprise a Session Initiation Protocol (SIP) message with a body and a header. In some examples, the header may comprise the device identifier type (e.g., IMEI or UUID) and/or device identifier value associated with the UE 202(A). The header or the body may comprise the MSISDN value associated with the UE 202(A). The body may contain the set of one or more capability indicators associated with the UE 202(A).

In some embodiments, the presence server 104 may extract the device identifier type, the device identifier value, the MSISDN value, and/or the set of one or more capability indicators from the subscribe message 308 and/or the subscribe message 310, for instance, to create a data entry in the device capabilities database 110.

In some embodiments, in response to receiving the subscribe message 310, the presence server 104 may determine a phone number type 312 associated with the phone number 302. For example, the presence server 104 may determine that the phone number 302 is associated with an entity that utilizes SIVR, an AA, a call tree, or the like.

In some embodiments, in response to receiving the subscribe message 310, the presence server 104 may perform capability discovery 314 to determine that the entity associated with the phone number type 312 supports enriched calling capabilities.

In some embodiments, in response to determining that that the phone number 302 is associated with an entity that utilizes SIVR, an AA, a call tree, or the like, and that the entity associated with the phone number 302 supports enriched calling capabilities, the presence server 104 may send a notify message 316 to the IMS core network 106 indicating that the phone number 302 is associated with an entity that utilizes SIVR, an AA, a call tree, or the like, and that the entity associated with the phone number 302 supports enriched calling capabilities. The IMS core network 106 may forward the notify message 316 to the UE 202(A) as notify message 318.

In some embodiments, in response to receiving the notify message 318, the UE 202(A) may perform capability discovery 320 to determine that the entity associated with the phone number 302 supports enriched calling and may present a subject line field on the interface of the UE 202(A).

In some embodiments, the UE 202(A) may receive a subject 322 from the user 304 via the subject line field presented on the interface of the UE 202(A).

In some embodiments, the UE 202(A) may send an invite message 324 that includes the subject 322 to the IMS core network 106. The IMS core network 106 may forward the invite message 324 to the TAS 110 as invite message 326.

In some embodiments, the TAS 110 may perform a parse 328 of the subject included in the invite message 326. For example, the TAS 110 may parse words from the subject line and determine each word in the subject line.

In some embodiments, the TAS 110 may send call request 330 to the computing device 112. The call request 330 may include the subject line and the individually parsed words to a computing device 112. The computing device 112 may comprise an artificial intelligence component, a media resource function (MRF) component, or the like. For example, the computing device 112 may store a list of words and a list of sub-entities that each correspond to a respective word. For instance, the subject 322 may read "why is my bill so high?" The TAS 110 may parse out the individual words at 328 and send the words (e.g., "why," "is," "my," "bill," "so," and "high") in the call request 330 to the computing device 112. The computing device 112 may determine a sub-entity associated with one of the parsed-out words, such as a billing department being associated with the word "bill."

In some examples, once the computing device 112 determines a sub-entity in which the user associated with the UE 202(A) wishes to communicate with, the computing device 112 may forward the call request 330 to the sub-entity directly. In some cases, the sub-entity may be associated with a telephone number that is different than the telephone number initially entered into the UE 202(A) and is associated with the call request. Thereby preventing the user associated with the UE 202(A) from having to navigate a call tree and/or interact with an SIVR or AA. In some cases, the computing device 112 is associated with entity associated with the phone number 302.

Figure 4:
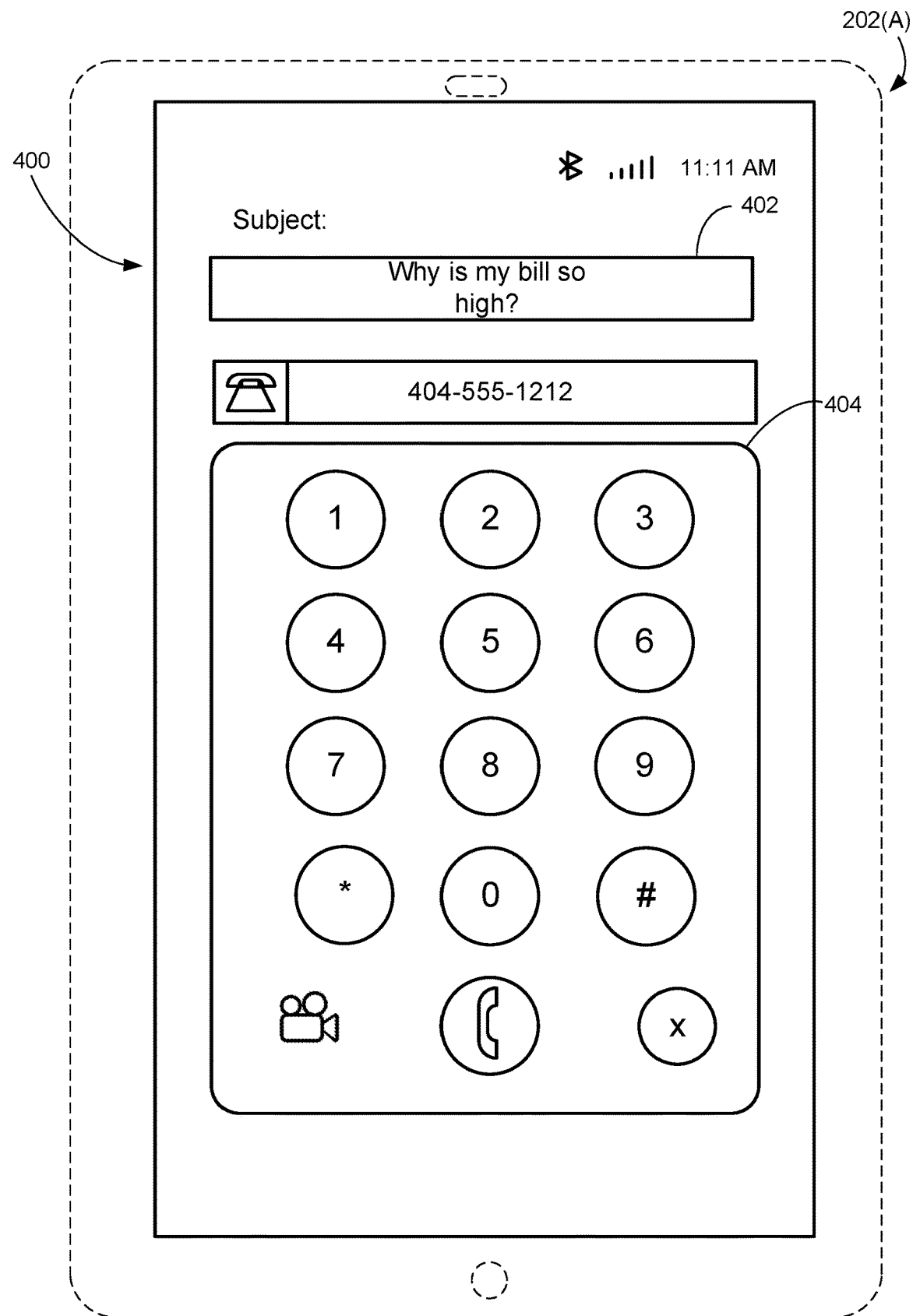
FIG. 4 depicts an example enriched calling graphical user interface (GUI) during one or more enriched calling processes.

FIG. 4 illustrates an example graphical user interface (GUI) 400 to enable enriched calling functions as described herein. The GUI 400 can include, for example, a subject line field 402. The subject line field 402 may enable a user to enter in a subject to be associated with an outgoing call. As illustrated in FIG. 4, the user may enter in a subject reading "Why is my bill so high?" In this case, if the user is calling a company to inquire about a service bill, by entering the subject "Why is my bill so high?", the call may be automatically directed to the companies billing department, which may have a phone number that is not made publicly available.

The GUI 400 may also include a number input 404. The number input 404 can comprise virtual buttons on a touchscreen, physical buttons (e.g., the user can press a number or letter on a keyboard or keypad), voice commands, or any other kind of input to enable the user to make the appropriate selection.

Figure 5:
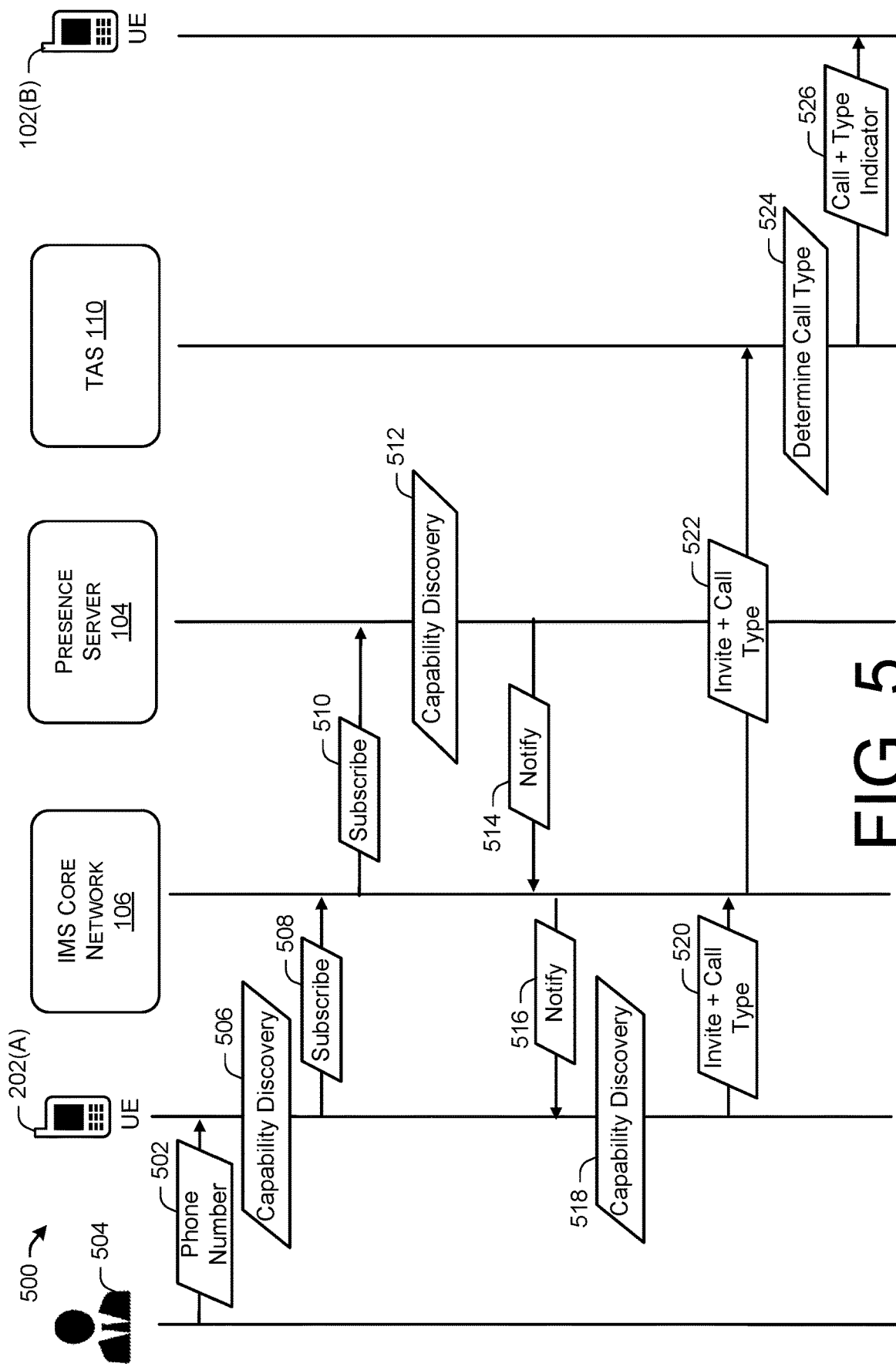
FIG. 5 depicts a call flow diagram illustrating example interactions of the systems, methods, and apparatuses of FIG. 1 during one or more enriched calling processes.

FIG. 5 depicts a call flow diagram illustrating example interactions of the systems disclosed herein during an enriched calling determination process. For instance, a system 500 (which may be similar or identical to the system(s) 100 and/or 200) may include first UE 202(A) in communication with the presence server 104 via the IMS core network 106, the TAS server 110, and the UE 102(B).

In some examples, the interactions of system 500 may include a phone number 502 entered into the UE 202(A) by a user 504. The phone number 502 may be associated with another UE, such as UE 102(B). In some cases, the UE 202(A) may perform a capability discovery 506 to determine if the UE 202(A) supports enriched calling. In some cases, if the UE 202(A) does support enriched calling, the UE 202(A) may include an indication that the UE 202(A) supports enriched calling when sending messages to the IMS core network 106.

In some embodiments, in response to receiving the phone number 502, the UE 202(A) may generate and/or send a subscribe message 508 to the presence server 104 via the IMS core network 106. In some cases, the IMS core network 106 may forward the subscribe message 508 to the presence server 104 as subscribe message 510.

In some embodiments, the subscribe message 508 and/or the subscribe message 510 may comprise a Session Initiation Protocol (SIP) message with a body and a header. In some examples, the header may comprise the device identifier type (e.g., IMEI or UUID) and/or device identifier value associated with the UE 202(A). The header or the body may comprise the MSISDN value associated with the UE 202(A). The body may contain the set of one or more capability indicators associated with the UE 202(A).

In some embodiments, the presence server 104 may extract the device identifier type, the device identifier value, the MSISDN value, and/or the set of one or more capability indicators from the subscribe message 508 and/or the subscribe message 510, for instance, to create a data entry in the device capabilities database 110.

In some embodiments, in response to receiving the subscribe message 510, the presence server 104 may perform capability discovery 512 to determine that the entity associated with the phone number 502 supports enriched calling capabilities.

In some embodiments, in response to determining that the entity associated with the phone number 302 supports enriched calling capabilities, the presence server 104 may send a notify message 514 to the IMS core network 106 indicating that the entity associated with the phone number 302 supports enriched calling capabilities. The IMS core network 106 may forward the notify message 514 to the UE 202(A) as notify message 516.

In some embodiments, in response to receiving the notify message 516, the UE 202(A) may perform capability discovery 518 to determine that the entity associated with the phone number 502 supports enriched calling and may determine a call type (e.g., conference call, group call, singular call) associated with the call request. In some cases, a group call may include a number of other UEs and the UE 202(A) may determine that a call session has already been initiated between the UE 202(A) and the other UEs.

In some embodiments, the UE 202(A) may send an invite message 520 that includes the call type to the IMS core network 106. The IMS core network 106 may forward the invite message 520 to the TAS 110 as invite message 522.

In some embodiments, the TAS 110 may perform a call type determination 524 in order to determine a call type associated with the call request. In some cases, the TAS 110 may determine a number of other UEs participating in an ongoing call session that is associated with the invite message 522.

In some embodiments, the TAS 110 may send call request 526 to the UE 102(B). The call request 526 may include an indication of the call type associated with the call request 526. In some cases, the call request 526 may cause the UE 102(B) to present an indication of the call type (e.g., conference call, group call, singular call) associated with the call request so that a user associated with the UE 102(B) may be informed of the type of call that they will be involved in if the call is answered.

Figure 6:
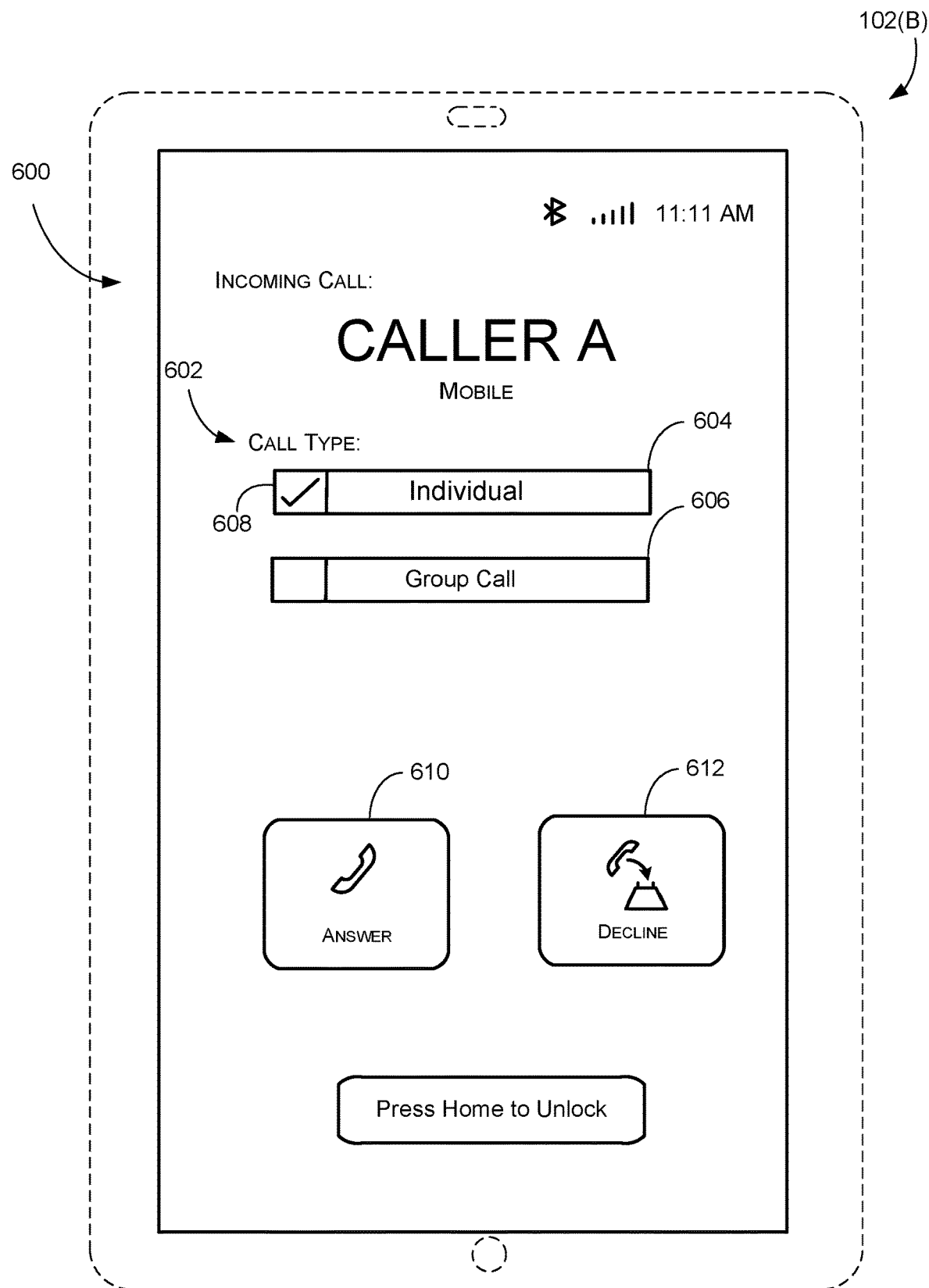
FIG. 6 depicts an example enriched calling graphical user interface (GUI) during one or more enriched calling processes.

FIG. 6 illustrates an example graphical user interface (GUI) 600 to enable enriched calling functions as described herein. The GUI 600 can include, for example, a call type indicator 602. The call type indicator may enable a user to determine if the incoming call is with an individual or is a group call. As illustrated in FIG. 6, the GUI 600 may present an incoming call from "CALLER A" and may present an "Individual" indicator 604 and a "Group Call" indicator 606. In this case, in response to the incoming call being from an individual, an indicator 608 may be presented next to the "Individual" indicator 604. Although, in the example of FIG. 6, the indicator 608 is illustrated as a checkmark, it is to be understood that any symbol may be used to indicate which type of call the incoming is determined to be. In some cases, no indicator may be used, and the GUI 600 may simply present either one of the "Individual" indicator 604 or the "Group Call" indicator 606 based on the call type.

The GUI 600 may also include an answer button 610 and a decline button 612 to enable the user associated with the UE 102(B) to answer or decline the incoming call. The answer button 610 and the decline button 612 can comprise virtual buttons on a touchscreen, physical buttons (e.g., the user can press a number or letter on a keyboard or keypad), voice commands, or any other kind of input to enable the user to make the appropriate selection.

Figure 7:
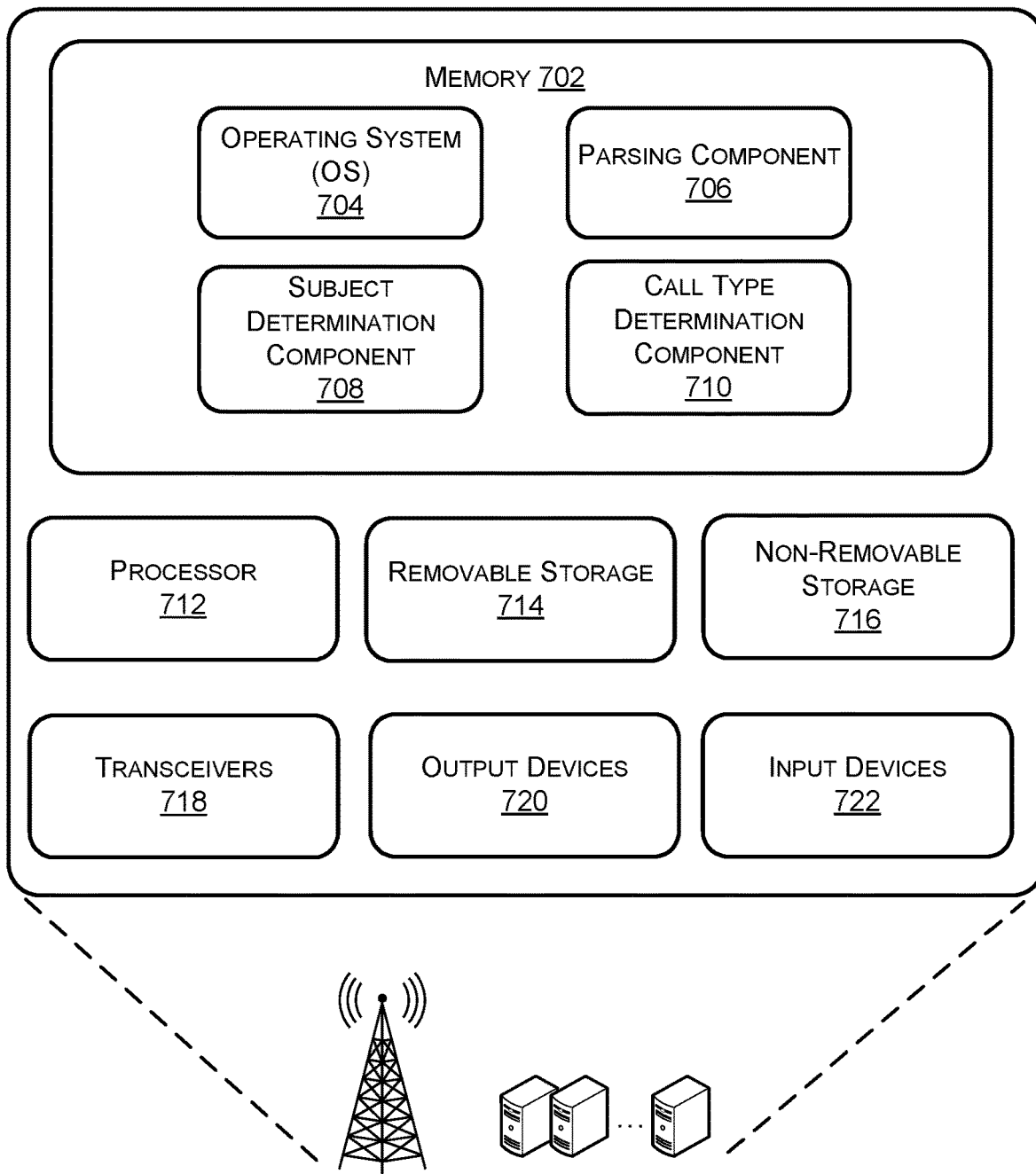
FIG. 7 depicts an example architecture of a computing device configured to enable one or more enriched calling processes.

FIG. 7 illustrates an example computing device 700 that may be representative of the TAS 110, the computing device 112, or a combination thereof, as discussed herein. The computing device 700 can comprise a number of components to execute part, or all, of the above-mentioned systems and methods. The computing device 700 can comprise memory 702 including, for example, an OS 704, a parsing component 706, a subject determination component 708, and a call type determination component 710. In various implementations, the memory 702 can be volatile (such as RAM), non-volatile (such as ROM, flash memory, etc.), or some combination of the two. The memory 702 can include all, or part, of the OS 704, the parsing component 706, the subject determination component 708, and the call type determination component 710 for the computing device 700, among other things.

The OS 704 can vary depending on the manufacturer of the computing device 700 and the type of component. Many servers, for example, run Linux or Windows server. Dedicated cellular routing servers may run specific telecommunications OSs. The OS 704 contains the modules and software that supports a computer's basic functions, such as scheduling tasks, executing applications, and controlling peripherals. The OS 704 can enable the computing device 700 to send and receive SIP messages, connect with UEs, provide audio and/or video playback, etc. Thus, the OS 704 can also enable the computing device 700 to perform some, or all, of the functions associated with the systems and methods discussed herein.

In some examples, the memory 702 can also include the parsing component 706. The parsing component 706 can enable the computing device 700 to parse words included in a subject line that is included in a call request (e.g., SIP Invite). For example, the parsing component 706 may parse words from the subject line and determine each word in the subject line.

In some examples, the memory 702 can also include the subject determination component 708. For example, the subject determination component 708 may store a list of words and a list of sub-entities that each correspond to a respective word. For instance, the subject line may read "why is my bill so high?" The parsing component 706 may parse out the individual words and send the words (e.g., "why," "is," "my," "bill," "so," and "high") the subject determination component 708. The subject determination component 708 may determine a sub-entity associated with one of the parsed-out words, such as a billing department being associated with the word "bill."

In some examples, the memory 702 can also include the call type determination component 710. The call type determination component 710 may determine a call type associated with a call request. In some cases, the call type determination component 710 may determine a number of other UEs participating in an ongoing call session that is associated with an invite message.

The computing device 700 can also comprise one or more processors 712. In some implementations, the processor(s) 712 can be a central processing unit (CPU), a graphics processing unit (GPU), both CPU and GPU, or any other processing unit. The computing device 700 can also include one or more of removable storage 714, non-removable storage 716, transceiver(s) 718, output device(s) 720, and input device(s) 722.

The computing device 700 may also include additional data storage devices (removable and/or non-removable) such as, for example, magnetic disks, optical disks, or tape. Such additional storage is illustrated in FIG. 7 by removable storage 714 and non-removable storage 716. The removable storage 714 and non-removable storage 716 can store some, or all, of the OS 704, the parsing component 706, the subject determination component 708, and the call type determination component 710.

Non-transitory computer-readable media may include volatile and nonvolatile, removable and non-removable tangible, physical media implemented in technology for storage of information, such as computer-readable instructions, data structures, program modules, or other data. The memory 702, removable storage 714, and non-removable storage 716 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the computing device 700. Any such non-transitory computer-readable media may be part of the computing device 700 or may be a separate database, databank, remote server, or cloud-based server.

In some implementations, the transceiver(s) 718 include any transceivers known in the art. In some examples, the transceiver(s) 718 can include wireless modem(s) to facilitate wireless connectivity with multiple UEs, the Internet, the cellular network, and/or an intranet via a cellular connection. The transceiver(s) 718 may enable the computing device 700 to connect with the UEs on multiple networks (e.g., 2G, 3G, 4G, and 5G networks). The transceiver(s) 718 can comprise multiple single frequency transceivers or one or more multi-frequency/multi-channel transceivers to enable the computing device 700 to communicate with tens, hundreds, or even thousands of UEs simultaneously.

The transceiver(s) 718 may include a radio transceiver that performs the function of transmitting and receiving radio frequency communications via an antenna (e.g., Wi-Fi or Bluetooth®) to connect to an IP core network or another network. In other examples, the transceiver(s) 718 may include wired communication components, such as a wired modem or Ethernet port.

In some implementations, the output device(s) 720 include any output devices known in the art, such as a display (e.g., a liquid crystal or thin-film transistor (TFT) display), a touchscreen display, speakers, a vibrating mechanism, or a tactile feedback mechanism. In some examples, the output device(s) 720 can play various sounds based on, for example, when a UE is connected or disconnected, when a video or audio stream starts or stops, when a transfer is declined, etc. Output device(s) 720 can also include ports for one or more peripheral devices, such as headphones, peripheral speakers, or a peripheral display.

In various implementations, input device(s) 722 include any input devices known in the art. For example, the input device(s) 722 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 8:
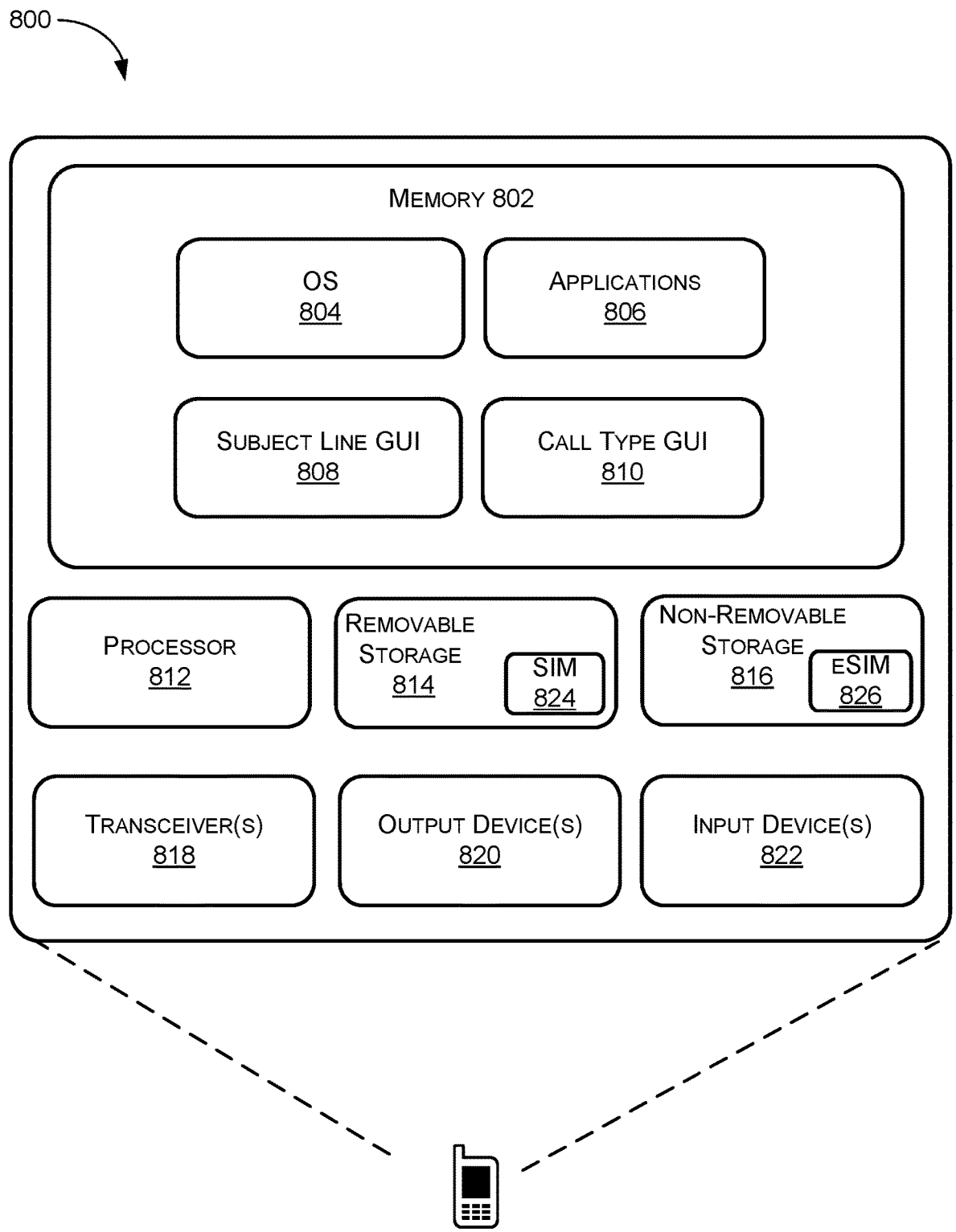
FIG. 8 depicts an example architecture of a user equipment (UE) configured to enable one or more enriched calling processes.

FIG. 8 depicts a component level view of a UE 800 (e.g., UE 102(A) and/or UE 102(B) for use with the systems and methods described herein. The UE 800 could be any UE capable of making audio and/or video calls on a cellular network, the IMS core network 106, and the like. For clarity, the UE 800 is described herein generally as a cell phone, smart phone, or laptop computer. One of skill in the art will recognize, however, that the systems and methods described herein can also be used with a variety of other electronic devices, such as, for example, tablet computers, desktops, and other network (e.g., cellular or IP network) connected devices. Indeed, the UE 800 can be any device that can send and receive video and/or audio calls that can benefit from improved call management.

The UE 800 can comprise several components to execute the above-mentioned functions. As discussed below, the UE 800 can comprise memory 802 including an operating system (OS) 804 and one or more standard applications 806. The standard applications 806 can include many features common to UE 800 such as, for example, calendars, call logs, voicemail, etc. In this case, the standard applications 806 can also comprise a video call application (e.g., Facetime®, Zoom®, Google Hangouts®, Skype®, etc.) and a standard audio call application to enable users to engage in audio and video calls, as described above. The standard applications 806 can also include contacts to enable the user to select a contact to initiate a video call and/or to select a transfer target.

The UE 800 can also comprise a subject line GUI 808 and a call type GUI 810. The subject line GUI 808 and the call type GUI 810 can be used in conjunction with the enriched calling capabilities of the UE 800 to enable the UE 800 to provide enriched calling features, such has presenting GUI 400 and/or GUI 600.

The UE 800 can also comprise one or more processors 812 and one or more of removable storage 814, non-removable storage 816, transceiver(s) 818, output device(s) 820, and input device(s) 822. In some examples, such as for cellular communication devices, the UE 800 can also include a subscriber identity module (SIM) 824 and/or an embedded SIM (eSIM) 826, which can include a mobile country code (MCC), mobile network code (MNC), international mobile subscriber identity (IMSI), and other relevant information. In some examples, one or more of the functions (e.g., standard applications 806 and/or subject the line GUI 808 and the call type GUI 810) can be stored on the SIM 824 or the eSIM 826 in addition to, or instead of, being stored in the memory 802.

In various implementations, the memory 802 can be volatile (such as random access memory (RAM)), non-volatile (such as read only memory (ROM), flash memory, etc.), or some combination of the two. The memory 802 can include all, or part, of the OS 804, applications 806, the subject line GUI 808, and the call type GUI 810, for the UE 800, among other things. In some examples, rather than being stored in the memory 802, some, or all, of the OS 804, applications 806, the subject line GUI 808, and the call type GUI 810 and other information (e.g., call history, contacts, etc.) can be stored on a remote server or a cloud of servers accessible by the UE 800 such as the IMS core network 106 and/or the TAS 110.

The memory 802 can also include the OS 804. Of course, the OS 804 varies depending on the manufacturer of the UE 800 and currently comprises, for example, iOS 11.4.1 for Apple products and Pie for Android products. The OS 804 contains the modules and software that support a UE's basic functions, such as scheduling tasks, executing applications, and controlling peripherals. In some examples, the OS 804 can enable the video call application to conduct video calls and call transfers, as described above, via the transceiver(s) 818. The OS 804 can send information to the subject line GUI 808 and the call type GUI 810, for example, to cause the subject line GUI 808 and the call type GUI 810 to display contact information, phone numbers, and other call data. The OS 804 can also receive inputs from the subject line GUI 808 and the call type GUI 810 to cause the transceiver to send data, for example, or to change a display on the UE 800, among other things. The OS 804 can also enable the UE 800 to send and retrieve other data via a cellular data connection or internet connection and perform other functions.

The UE 800 can also comprise one or more processors 812. In some implementations, the processor(s) 812 can be a central processing unit (CPU), a graphics processing unit (GPU), both CPU and GPU, or any other processing unit. The UE 800 may also include additional data storage devices (removable and/or non-removable) such as, for example, magnetic disks, optical disks, or tape. Such additional storage is illustrated in FIG. 8 by removable storage 814 and non-removable storage 816. The removable storage 814 and non-removable storage 816 can store some, or all, of the OS 804, applications 806, the subject line GUI 808, and the call type GUI 810.

Non-transitory computer-readable media may include volatile and nonvolatile, removable and non-removable tangible, physical media implemented in technology for storage of information, such as computer readable instructions, data structures, program modules, or other data. The memory 802, removable storage 814, and non-removable storage 816 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 800. Any such non-transitory computer-readable media may be part of the UE 800 or may be a separate database, databank, remote server, or cloud-based server.

In some implementations, the transceiver(s) 818 include any transceivers known in the art. In some examples, the transceiver(s) 818 can include wireless modem(s) to facilitate wireless connectivity (e.g. wireless transmissions) with other components (e.g., between UEs), the Internet, and/or an intranet via cellular and IP networks. Specifically, the transceiver(s) 818 can include one or more transceivers 818 that can enable the UE 800 to connect to, and transfer, both video and/or audio calls. Thus, the transceiver(s) 818 can include multiple single-channel transceivers 818 or a multi-frequency, multi-channel transceiver 818 to enable the UE 800 to send and receive a bidirectional video stream and a bidirectional audio stream, among other things. The transceiver(s) 818 can enable the UE 800 to connect to multiple networks including, but not limited to 2G, 3G, 4G and 5G networks. The transceiver(s) 818 can also include one or more transceivers 818 to enable the UE 800 to connect to future (e.g., 6G) networks, Internet-of-Things (IoT), machine-to machine (M2M), and other current and future networks.

The transceiver(s) 818 may also include one or more radio transceivers that perform the function of transmitting and receiving radio frequency communications via an antenna (e.g., Wi-Fi or Bluetooth®). In other examples, the transceiver(s) 818 may include wired communication components, such as a wired modem or Ethernet port, for communicating via one or more wired networks. The transceiver(s) 818 can enable the UE 800 to make audio and video calls, download files, access web applications, and provide other communications associated with the systems and methods, described above.

In some implementations, the output device(s) 820 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display, on which the subject line GUI 808 and the call type GUI 810 can be displayed. The output device(s) 820 can also include speakers, or similar devices, to play sounds or ringtone when an audio call, video call, or transferred call is being received. The output device(s) 820 can also provide tones or sounds when a video transfer is complete, for example, or when other tasks associated with the systems and methods described herein are initiated or completed. Output device(s) 820 can also include ports for one or more peripheral devices, such as headphones, peripheral speakers, or a peripheral display.

In various implementations, input device(s) 822 include any input devices known in the art. For example, the input device(s) 822 may include a camera, a microphone, or a keyboard/keypad. The input device(s) 822 can include a touch-sensitive display or a keyboard to enable users to enter data and make requests and receive responses via web applications (e.g., in a web browser), make audio and video calls, and use the standard applications 808, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

The touch sensitive display can be used to display the subject line GUI 808, and the call type GUI 810 and to act as both an input device 822 and an output device 820. The touch sensitive display can display the keypad, for example, to enable the user to enter a subject line on the subject line GUI 808. Thus, the touch sensitive display can display the subject line GUI 808 and the call type GUI 810, including relevant call information and receive selections from the user (e.g., to answer a call, decline a call, etc.), among other things.

Example Processes

Figure 9:
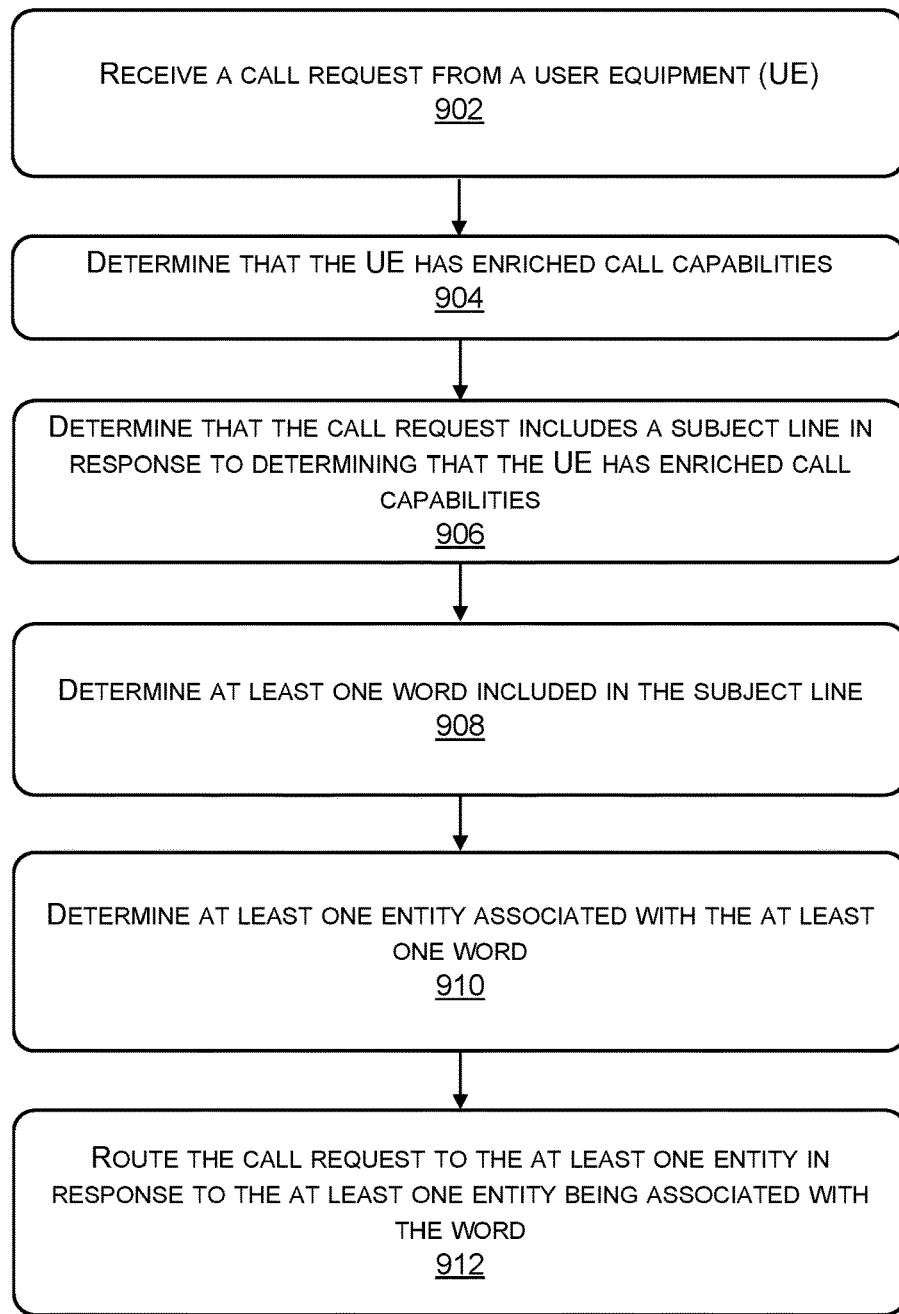
FIG. 9 depicts an example process for enabling enriched calling services on a UE.
Figure 10:
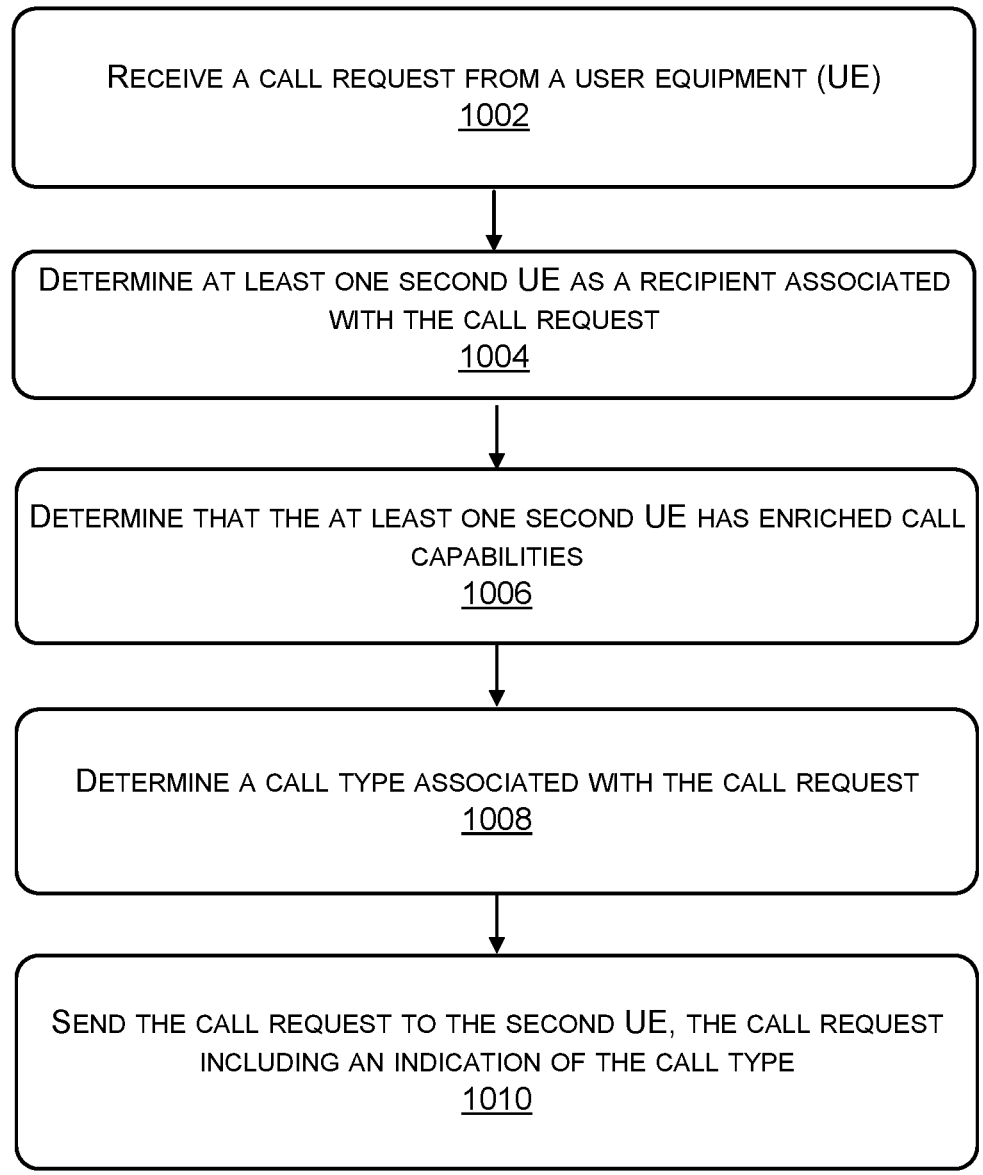
FIG. 10 depicts another example process for enabling enriched calling services on a UE.

FIGS. 9-11 illustrate example processes. These processes are illustrated as logical flow graphs, each operation of which represents a sequence of operations that can be implemented in hardware, software, or a combination thereof. In the context of software, the operations represent computer-executable instructions stored on one or more computer readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted, reordered, or combined in any order and/or in parallel to implement the processes.

FIG. 9 illustrates an example process 900 for routing a call request based at least in part on a subject line associated with the call request. As illustrated at 902, a computing device may receive a call request from a user equipment (UE). For example, the UE 102(A) may attempt to place a call to an entity that operates a SIVR, an AA, a call tree, or the like. In some examples, the IMS core network 106 may receive a call request from the UE 102(A). The call request may be an SIP subscribe message and include a telephone number that is associated with an entity that operates a SIVR, an AA, a call tree, or the like, and is associated with the computing device 112.

At 904, the computing device may determine that the UE has enriched call capabilities. For example, the IMS core network 106 may send the call request to the presence server 104 and the presence server 104 may determine whether or not the UE 102(A) has enriched calling capabilities. In some examples, the presence server 104 may access the device capabilities database 108 to determine if the UE 102(A) has enriched calling capabilities. In some examples, the call request may include an indication that the UE 102(A) has enriched calling capabilities and the IMS core network 106 may determine that the UE 102(A) has enriched calling capabilities based on the call request.

At 906, the computing device may determine that the call request includes a subject line in response to determining that the UE has enriched call capabilities. For example, the presence server 104 determines that the UE 102(A) has enriched calling capabilities, the IMS core network 106 may cause the UE 102(A) to present a subject line field that allows a user associated with the UE 102(A) to enter a subject associated with the call request. In some cases, the UE 102(A) may present the subject line field automatically when the user is making a call.

At 908, the computing device may determine at least one word included in the subject line. For example, the IMS core network 106 may provide the call request and the subject line to the TAS 110. The TAS 110 may parse words from the subject line and determine each word in the subject line.

At 910, the computing device may determine at least one entity associated with the at least one word. For example, the TAS 110 may send the call request, the subject line, and the individually parsed words to a computing device 112. The computing device 112 may comprise an artificial intelligence component, a media resource function (MRF) component, or the like. For example, the computing device 112 may store a list of words and a list of sub-entities that each correspond to a respective word. For instance, the IMS core network 106 may receive a subject line reading "why is my bill so high?" The TAS 110 may parse out the individual words (e.g., "why," "is," "my," "bill," "so," and "high") from the subject line and send the parsed words with the call request to the computing device 112. The computing device 112 may determine a sub-entity associated with one of the parsed-out words, such as a billing department being associated with the word "bill."

At 912, the computing device may route the call request to the at least one entity in response to the at least one entity being associated with the word. For example, once the computing device 112 determines a sub-entity in which the user associated with the UE 102(A) wishes to communicate with, the computing device 112 may forward the call request to the sub-entity directly. In some cases, the sub-entity may be associated with a telephone number that is different than the telephone number initially entered into the UE 102(A) and is associated with the call request.

FIG. 10 illustrates an example process 1000 for providing a call type indicator to a terminating device. As illustrated at 1002, a computing device may receive a call request from a first user equipment (UE). For example, At 1004, the computing device may determine at least one second UE as a recipient associated with the call request. For example, the call request (e.g., SIP invite) may include a telephone number associated with a terminating device, such as UE 102(B).

At 1006, the computing device may determine that the second UE has enriched call capabilities. For example, the IMS core network 106 may send the call request to the presence server 104 and the presence server 104 may determine whether or not the UE 102(B) has enriched calling capabilities. In some examples, the presence server 104 may access the device capabilities database 108 to determine if the UE 102(B) has enriched calling capabilities.

At 1008, the computing device may determine a call type associated with the call request. For example, the call request may indicate whether the call is a singular call (e.g., a one-on-one call between the UE 102(A) and UE 102(B)) or a group call. In some cases, a group call may include a number of other UEs and the call request may indicate that a call session has already been initiated between the UE 102(A) and the other UEs.

At 1010, the computing device may send the call request to the second UE, the call request including an indication of the call type. For example, the IMS core network 106 may determine a call type (e.g., conference call, group call, singular call) associated with the call request and provide the call request as well as an indicator of the call type to the UE 102(B).

FIG. 11 illustrates an example process 1100 for routing a call request based at least in part on a subject line associated with the call request. As illustrated at 1102, a computing device may receive a call request from a telephony application server (TAS) associated with a user equipment (UE), the call request including multiple parsed words of a subject line associated with the call request. For example, the TAS 110 may send call request 330 to the computing device 112.

At 1104, the computing device may identify a word from the multiple parsed words. For example, call request 330 may include the subject line and the individually parsed words to a computing device 112.

At 1106, the computing device may determine that the word is associated with at least one sub-entity of an entity. For example, the computing device 112 may store a list of words and a list of sub-entities that each correspond to a respective word. For instance, the subject 322 may read "why is my bill so high?" The TAS 110 may parse out the individual words at 328 and send the words (e.g., "why," "is," "my," "bill," "so," and "high") in the call request 330 to the computing device 112. The computing device 112 may determine a sub-entity associated with one of the parsed-out words, such as a billing department being associated with the word "bill."

At 1108, the computing device may route the call request to the at least one sub-entity in response to the at least one sub-entity being associated with the word. For example, once the computing device 112 determines a sub-entity in which the user associated with the UE 202(A) wishes to communicate with, the computing device 112 may forward the call request 330 to the sub-entity directly. In some cases, the sub-entity may be associated with a telephone number that is different than the telephone number initially entered into the UE 202(A) and is associated with the call request.

Although FIGS. 9-11 illustrate example operations, the described operations in these figures (and all other methods and operations disclosed herein) may be performed in other orders different than those illustrated in FIGS. 9 and 10 and multiple steps may be performed simultaneously or in parallel. Furthermore, in some embodiments, one or more operations illustrated in FIGS. 9 and 10 may be omitted, repeated, and/or combined with other operations illustrated in FIGS. 9 and 10, or any other operations and components discussed in this disclosure.

Example Clauses

A: A system comprising: one or more processors; a memory; and one or more components stored in the memory and executable by the one or more processors to perform operations comprising: receiving a call request from a first user equipment (UE); determining at least one second UE as a recipient associated with the call request; determining that the second UE has enriched call capabilities; determining a call type associated with the call request; and sending the call request to the second UE, the call request including an indication of the call type.

B: The system of claim A, wherein the call request includes a Session Initiation Protocol (SIP) INVITE and the call type is included in the SIP INVITE.

C: The system of claim A or B, wherein the call type includes at least one of a conference call or an individual call.

D: The system of claim A-C, wherein the at least one of the first UE or the second UE is a VoLTE device.

E: The system of claim A-D, wherein the recipient is a first recipient and the call request includes a second recipient.

F: The system of claim A-E, wherein the call type is determined by a telephony application server (TAS) and the operations further comprise, in response to determining the call type associated with the call request, adding a call identifier string to a subject field associated with the call request.

G: The system of claim A-F, wherein sending the call request to the second UE causes the second UE to present a call type indicator on a graphical user interface of the second UE.

H: A method comprising: receiving a call request from a first user equipment (UE); determining at least one second UE as a recipient associated with the call request; determining that the second UE has enriched call capabilities; determining a call type associated with the call request; and sending the call request to the second UE, the call request including an indication of the call type.

I: The method of claim H, wherein the call request includes a Session Initiation Protocol (SIP) INVITE and the call type is included in the SIP INVITE.

J: The method of claim H or I, wherein the call type includes at least one of a conference call or an individual call.

K: The method of claim H-J, wherein the at least one of the first UE or the second UE is a VoLTE device.

L: The method of claim H-K, wherein sending the call request to the second UE causes the second UE to present a call type indicator on a graphical user interface of the second UE.

M: The method of claim H-L, wherein the recipient is a first recipient and the call request includes a second recipient.

N: The method of claim M, further comprising determining that the call type is a group call in response to the call request including the first recipient and the second recipient.

O: The method of claim H-L, wherein sending the call request to the second UE causes the second UE to present a call type indicator on a graphical user interface of the second UE.

P: The method of claim O, wherein the call type indicator includes an identifier of at least a third UE included in the call request.

Q: A method comprising: receiving a call request from a first user equipment (UE); determining at least one second UE as a recipient associated with the call request; determining that the second UE has enriched call capabilities; determining that the call request is associated with a group call; and sending the call request to the second UE, the call request including an indication of the call request is a group call.

R: The method of claim Q, wherein the call request includes a Session Initiation Protocol (SIP) INVITE and the indication that the call request is the group call is included in the SIP INVITE.

S: The method of claim Q or R, wherein the at least one of the first UE or the second UE is a VoLTE device.

T: The method of claim Q-S, wherein sending the call request to the second UE causes the second UE to present a call type indicator on a graphical user interface of the second UE.

U: A system comprising: one or more processors; a memory; and one or more components stored in the memory and executable by the one or more processors to perform operations comprising: receiving a call request from a user equipment (UE); determining that the UE has enriched call capabilities; determining that the call request includes a subject line in response to determining that the UE has enriched call capabilities; determining at least one word included in the subject line; determining at least one entity associated with the at least one word; and routing the call request to the at least one entity in response to the at least one entity being associated with the at least one word.

V: The system of claim U, wherein the call request includes a Session Initiation Protocol (SIP) INVITE and the subject line is included in the SIP INVITE.

W: The system of claim U or V, the operations further comprising: determining that the call request includes a telephone number associated with an entity type; and causing the UE to display a subject line field in response to the telephone number being associated with the entity type.

X: The system of claim U-W, wherein: the entity type is a business; the at least one entity is a sub-entity of the business; and determining the at least one entity being associated with the at least one word includes selecting the at least one entity from a list of multiple sub-entities of the business.

Y: The system of claim U-X, wherein determining the at least one word included in the subject line includes parsing multiple words from the subject line.

Z: The system of claim Y, the operations further comprising: assigning at least one weight to the at least one word; and determining the at least one entity associated with the at least one word based at least in part on the at least one weight.

AA: The system of claim U-X, wherein the call request includes a first telephone number and the at least one entity is associated with a second telephone number that is different than the first telephone number.

AB: A method comprising: receiving a call request from a user equipment (UE); determining that the UE has enriched call capabilities; determining that the call request includes a subject line in response to determining that the UE has enriched call capabilities; determining at least one word included in the subject line; determining at least one entity associated with the at least one word; and routing the call request to the at least one entity in response to the at least one entity being associated with the at least one word.

AC: The method of claim AB, wherein the call request includes a Session Initiation Protocol (SIP) INVITE and the subject line is included in the SIP INVITE.

AD: The method of claim AB or AC, further comprising: determining that the call request includes a telephone number associated with an entity type; and causing the UE to display a subject line field in response to the telephone number being associated with the entity type.

AE: The method of claim AB-AD, wherein: the entity type is a business; the at least one entity is a sub-entity of the business; and determining the at least one entity being associated with the at least one word includes selecting the at least one entity from a list of multiple sub-entities of the business.

AF: The method of claim AB-AE, wherein determining the at least one word included in the subject line includes parsing multiple words from the subject line.

AG: The method of claim AF, further comprising: assigning at least one weight to the at least one word; and determining the at least one entity associated with the at least one word based at least in part on the at least one weight.

AH: The method of claim AB-AG, wherein the call request includes a first telephone number and the at least one entity is associated with a second telephone number that is different than the first telephone number.

AI: The method of claim AB-AH, wherein determining the at least one word included in the subject line includes parsing, by a telephony application server (TAS) the subject line into individual words.

AJ: The method of claim AB-AI, wherein routing the call request to the at least one entity is performed by at least one of an artificial intelligence component or a media resource function (MRF) component.

AK: A system comprising: one or more processors; a memory; and one or more components stored in the memory and executable by the one or more processors to perform operations comprising: receiving a call request from a telephony application server (TAS) associated with a user equipment (UE), the call request including multiple parsed words of a subject line associated with the call request; identifying a word from the multiple parsed words; determining that the word is associated with at least one sub-entity of an entity; and routing the call request to the at least one sub-entity in response to the at least one sub-entity being associated with the word.

AL: The system of claim AK, wherein the call request includes a Session Initiation Protocol (SIP) INVITE and the subject line is included in the SIP INVITE.

AM: The system of claim AK or AL, wherein: the entity is a business; and determining that the word is associated with the at least one sub-entity includes selecting the at least one sub-entity from a list of multiple sub-entities of the business.

AN: The system of claim AK-AM, the operations further comprising: assigning a weight to each of the multiple parsed words; and determining that the word is associated with the at least one sub-entity is based at least in part on the weight assigned to each of the multiple parsed words.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A system comprising:
one or more processors;
a memory; and
one or more components stored in the memory and executable by the one or more processors to perform operations comprising:
receiving a call request for a first entity from a user equipment (UE);
determining that the call request includes a telephone number associated with an entity type;
determining that the UE has enriched call capabilities;
causing the UE to display a subject line field in response to the telephone number being associated with the entity type and in response to determining that the UE has enriched capabilities;
determining that the call request includes a subject line entered via the subject line field in response to determining that the UE has enriched call capabilities;
determining at least one word included in the subject line;
determining at least one second entity associated with the at least one word;
establishing a call to the first entity; and
routing the call to the at least one second entity in response to the at least one second entity being associated with the at least one word.

2. The system of claim 1, wherein the call request includes a Session Initiation Protocol (SIP) INVITE and the subject line is included in the SIP INVITE.

3. The system of claim 1, wherein:
the entity type is a business;
the at least one second entity is a sub-entity of the business; and
determining the at least one second entity being associated with the at least one word includes selecting the at least one second entity from a list of multiple sub-entities of the business.

4. The system of claim 1, wherein determining the at least one word included in the subject line includes parsing multiple words from the subject line.

5. The system of claim 4, the operations further comprising:
assigning at least one weight to the at least one word; and
determining the at least one second entity associated with the at least one word based at least in part on the at least one weight.

6. The system of claim 1, wherein the call request includes a first telephone number and the at least one second entity is associated with a second telephone number that is different than the first telephone number.

7. A method comprising:
receiving a call request for a first entity from a user equipment (UE);
determining that the call request includes a telephone number associated with an entity type;
determining that the UE has enriched call capabilities;
causing the UE to display a subject line field in response to the telephone number being associated with the entity type and in response to determining that the UE has enriched capabilities;
determining that the call request includes a subject line entered via the subject line field in response to determining that the UE has enriched call capabilities;
determining at least one word included in the subject line;
determining at least one second entity associated with the at least one word;
establishing a call to the first entity; and
routing the call to the at least one second entity in response to the at least one second entity being associated with the at least one word.

8. The method of claim 7, wherein the call request includes a Session Initiation Protocol (SIP) INVITE and the subject line is included in the SIP INVITE.

9. The method of claim 7, wherein:
the entity type is a business;
the at least one second entity is a sub-entity of the business; and
determining the at least one second entity being associated with the at least one word includes selecting the at least one second entity from a list of multiple sub-entities of the business.

10. The method of claim 7, wherein determining the at least one word included in the subject line includes parsing multiple words from the subject line.

11. The method of claim 10, further comprising:
assigning at least one weight to the at least one word; and
determining the at least one second entity associated with the at least one word based at least in part on the at least one weight.

12. The method of claim 7, wherein the call request includes a first telephone number and the at least one second entity is associated with a second telephone number that is different than the first telephone number.

13. The method of claim 7, wherein determining the at least one word included in the subject line includes parsing, by a telephony application server (TAS) the subject line into individual words.

14. The method of claim 7, wherein routing the call request to the at least one entity is performed by at least one of an artificial intelligence component or a media resource function (MRF) component.

15. A system comprising:
one or more processors;
a memory; and
one or more components stored in the memory and executable by the one or more processors to perform operations comprising:
receiving a call request from a telephony application server (TAS) associated with a user equipment (UE);
determining that the call request includes a telephone number associated with an entity type;
causing the UE to display a subject line field in response to the telephone number being associated with the entity type, the call request including multiple parsed words of a subject line associated with the call request;
identifying a word from the multiple parsed words;
determining that the word is associated with at least one sub-entity of an entity;
establishing a call to the entity; and routing the call request to the at least one sub-entity in response to the at least one sub-entity being associated with the word.

16. The system of claim 15, wherein the call request includes a Session Initiation Protocol (SIP) INVITE and the subject line is included in the SIP INVITE.

17. The system of claim 15, wherein:
the entity is a business; and
determining that the word is associated with the at least one sub-entity includes selecting the at least one sub-entity from a list of multiple sub-entities of the business.

18. The system of claim 15, the operations further comprising:
assigning a weight to each of the multiple parsed words; and
determining that the word is associated with the at least one sub-entity is based at least in part on the weight assigned to each of the multiple parsed words.

19. The system of claim 1, the operations further comprising:
assigning at least one weight to at least one word included in the subject line; and
determining the at least one second entity associated with the at least one word based at least in part on the at least one weight, wherein the at least one weight is based at least in part on a previous call history associated with the first entity.

20. The system of claim 1, the operations further comprising:
assigning at least one weight to at least one word included in the subject line; and
determining the at least one second entity associated with the at least one word based at least in part on the at least one weight, wherein the at least one weight is based at least in part on a word type associated with the word, the word type identifying at least one of a noun, a pro-noun, an adjective, or a verb.

* * * * *